United States Patent Office 3,019,770
Patented Feb. 6, 1962

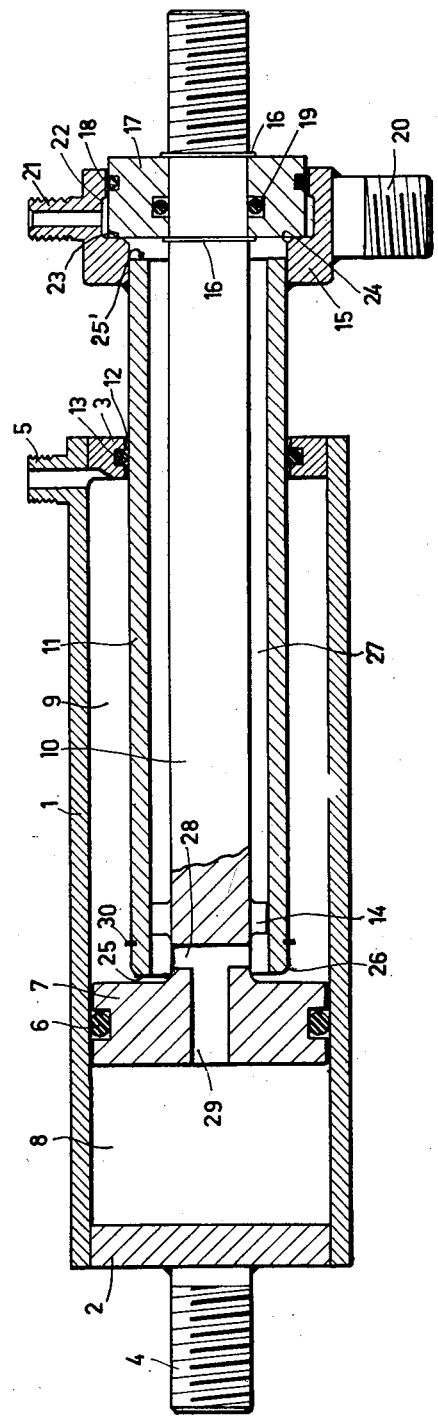

3,019,770
HYDRAULIC DEVICE
Valentin Balass, Seestrasse 355, Zurich, Switzerland
Filed Oct. 1, 1959, Ser. No. 843,792
6 Claims. (Cl. 121—38)

The present invention relates to a pressure fluid operated actuator device or servo-assisting control of the type, comprising a fluid-operated working piston reciprocable in a working cylinder by fluid control members connected for movement with said piston and actuatable in opposite directions axially.

According to the present invention the fluid control members in such a device are formed as valves having a pair of cooperating sealing surfaces pressed tightly one upon the other, whereby the working or effective pressure of the fluid is directly proportional to the momentary closing force of the valves.

Other features and advantages of the invention will become apparent from the ensuing description of a preferred embodiment thereof, given by way of example only, and in which reference will be made to the accompanying drawing, the sole figure of which shows an axial section through such embodiment.

Referring to the drawing the ends of a cylinder 1 are hermetically closed by means of covers 2 and 3. Cover 2 is provided with a bolt end or threaded tap 4 by means of which the cylinder may be anchored to a stationary or movable element. Near the cover 3 there is provided an inlet 5 for a pressure fluid.

A piston 7 packed by means of an O-ring 6 separates the inner hollow space of cylinder 1 into a chamber 8 and a chamber 9. The piston rod 10 is surrounded by a control sleeve 11 slidably guided thereon and extending through a boring of cover 3. An O-ring 13 packs the control sleeve 11 in the cover 3. At its end facing the piston 7 the control sleeve 11 is guided on radial ribs 14 of the piston rod 10. At its other end the control sleeve 11 is provided with a collar 15 guided on a supporting plate or disc 17 mounted between two split rings 16 on the piston rod 10. O-rings 18 and 19 form packings between the supporting plate 17 and the collar 15 and the piston rod 10, respectively. The collar 15 carries a threaded tap 20 and further a fluid outlet 21. The latter opens into an annular groove or space 22 between the collar 15 and the plate 17. A valve seat 23 formed in the collar 15 and having its inner ring edge bevelled as at 24 abuts in the represented position of the parts the inner front surface of the supporting plate 17 which serves as valve disc. Thereby a front face 25' remains free which corresponds in dimension to the sectional area of the control sleeve 11. The front face of the control sleeve facing the piston and bevelled as at 26 forms a further valve seat 25 cooperating with the piston. The arrangement is such that when valve seat 23 rests at the plate 17 the valve seat 25 is spaced from the piston surface. Thereby chamber 9 communicates with the annular chamber 27 extending between the piston rod 10 and the control sleeve 11 and over a transverse boring 28 in piston rod 10 and an axial conduit 29 in piston 7 also with the chamber 8. If the control sleeve 11 is displaced until the valve seat 25 abuts the piston 7 the valve seat 23 is lifted from the supporting plate 17 and the chamber 8 and the annular chamber 27 are connected over the annular space 22 with the outlet 21, while chamber 9 is tightly sealed from said chambers.

In its inner end portion the control sleeve 11 is provided with an outer split ring 30 which upon movement of the piston 7 towards the cover 3 abuts the latter before the corresponding outer dead point is attained. On the other hand, the arrangement is such that upon movement of the piston in opposite direction the collar 15 abuts the cover 3 before the inner dead point is reached. The purpose of such arrangement shall be explained later on.

Assuming now that a pressure source (not represented) for example an oil pump, is connected with the inlet 5 and that a reservoir (not represented) from which the oil pump draws oil is connected with the outlet 21. Assuming further that the cylinder 1 is stationarily anchored by means of the threaded tap 4 and that the thread of the piston rod is connected with a not represented element to be moved. Assuming finally that the threaded tap 20 is connected with a not represented actuating member. For example, it could be assumed that the described device is anchored to the frame of an automobile that the piston rod 10 is connected with the guided or front wheels and the threaded tap 20, i.e. the control sleeve 11 is connected with the steering wheel of this automobile. In the represented position of the control sleeve 11 the oil flows into the chamber 9 and from the latter passing by the front surface 25 into the chamber 8. As long as by turning the steering wheel the valve seat 23 of the control sleeve 11 is pressed against the supporting plate the return flow is locked. The oil fills chamber 8 and the piston 7 is moved towards the cover 3, i.e. towards the outer dead point. The force thereby exerted or imparted to the piston rod 10 and through the latter to the front wheels of the vehicle depends on the circular area corresponding to the outer diameter of the control sleeve 11. During the movement of piston 7 towards its outer dead point the same pressure acts on two equal front surfaces of the control sleeve arranged back to back, whereby the control sleeve is hydraulically unloaded. Simultaneously the pressure acts on the front surface corresponding to the bevelling 24 and tends to lift the valve seat 23 from the supporting plate 17, this force being overcome by the force exerted onto the steering wheel.

As soon as the steering wheel is not turned anymore, the supporting plate 17 and the valve seat 23 are separated from each other by the oil and the oil return to the reservoir through outlet 21 is released.

If the steering wheel is turned in opposite direction the valve seat 25 of the control sleeve 11 sealingly abuts the piston 7. Thereby a pressure is built-up in chamber 9, which pressure acts onto the smaller piston surface and displaces the piston 7 towards its inner dead point. The oil displaced out of chamber 8 is discharged through conduit 29, boring 28 and annular space 26 passing by the valve seat 23. The passages are so dimensioned that the mentioned spaces and passages are practically free from pressure. It results therefrom that again no hydraulic force acts upon the control sleeve 11, exception made of that exerted by the pressure in chamber 9 onto the front surface corresponding to the bevelling 26. This force tends to lift the control sleeve 11 from piston 7, it is however overcome by force exerted at the steering wheel. As soon as the latter is not turned anymore, the piston 7 and the control sleeve 11 are separated until the discharge of the oil from chamber 9 is released. If thus the control sleeve 11 is not influenced from the outside, it is centered by the action of the oil pressure. Similarly, the piston movement in the dead points is automatically prevented, as once the split ring 30 and the other time the collar 15 abut against the cover 3 so that the control sleeve 11 is lifted from the piston 7 or from the supporting plate 17, respectively.

The working pressure in cylinder 1 and thus the force available at the piston rod 10 always depends on the force pressing the valve seats at the associated valve body. The actuating force which must be produced at the control sleeve 11 thus always is proportional to the force desired or available respectively, at the piston rod, i.e.

the device may be actuated with feeling. Thereby the bevellings 24, 26 act as reaction surfaces of equal dimension increasing the feelingness. However, these bevellings may also be dispensed with.

The actuation with feel makes the device particularly appropriated as a steering aid for vehicles, as the contact with the road is fully maintained. In such application also the mentioned automatical centering of the control sleeve 11 renders possible the automatic return of the front wheels. For other purposes, for example for use in presses the described control or device could be operated by means of a hand lever engaging the control sleeve or the piston rod, respectively, and producing the relative movement of these elements.

In the represented embodiment the valve seats may simultaneously serve to transmit forces between the piston 7 and the control sleeve 11, for example if the oil pressure lacks. These tasks could also be separated by providing for example abutting surfaces and resilient packing members. The seats could of course also be conical, and it would further be possible to form the control sleeve with the valve seats and the associated valve body or bodies into one unit which could be arranged on the piston rod or which could be coupled in parallel to the piston rod with the element to be moved. In vehicles having a divided steering tie or cross rod it is possible for example to provide separate such valve units and working pistons for each tie rod part.

What I claim is:

1. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means connected for movement with said piston, said control means including two valves and a control member axially reciprocable with respect to said piston for simultaneous operation of said valves in opposite sense, each valve having a pair of sealing members, one sealing member being connected to the piston and the other sealing member being connected to the control member, the sealing members of each pair having cooperating sealing surfaces pressed tightly one upon the other when the valve is closed and forming a passage between them when the valve is opened, whereby the fluid pressure propelling the piston is directly proportional to the closing force of the valves acting on the control member.

2. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means including two valve bodies connected to the piston, a hollow control member axially reciprocable with respect to the piston between said valve bodies, a sealing ring cooperating with an outer cylindrical sealing surface of said hollow member, a pressure chamber hydraulically connected to said annular working face, said hollow member projecting through said sealing ring into said pressure chamber, said valve bodies and said hollow member having cooperating annular sealing faces tightly pressed one upon the other when the hollow member is forced against the respective valve body and forming a passage between said sealing faces, when the hollow member is moved in the opposite direction, the interior of the hollow member being continuously connected to said circular working face and being temporarily connected through said passages to the annular working face and to a return line respectively.

3. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means including two valve bodies connected to the piston, a hollow control member axially reciprocable with respect to the piston between said valve bodies, a sealing ring cooperating with an outer cylindrical sealing surface of said hollow member, a pressure chamber hydraulically connected to said annular working face, asid hollow member projecting through said sealing ring into said pressure chamber, said valve bodies and said hollow member having cooperating annular sealing faces tightly engaging each other when the hollow member is forced against the respective valve bodies and forming a passage between said sealing faces when the hollow member is moved in the opposite direction, the interior of the hollow member continuously hydraulically connected with said circular working face and being temporarily hydraulically connected through said passages with the annular working face and to a return line respectively, the outer diameter of the sealing surface of the hollow member adjacent to the passage to the annular working face being not greater than and the inner diameter of the other sealing surfaces of the hollow member being not smaller than the diameter of said cylindrical sealing surface.

4. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means including two valve bodies connected to the piston, a hollow control member axially reciprocable with respect to the piston between said valve bodies, a sealing ring cooperating with an outer cylindrical sealing surface of said hollow member, a pressure chamber hydraulically connected to said annular working face, said hollow member projecting through said sealing ring into a pressure chamber, said valve bodies and said hollow member having cooperating annular sealing faces tightly pressed to each other when the hollow member is forced against the respective valve body and forming a passage between said sealing faces when the hollow member is moved in the opposite direction, the interior of the hollow member being continuously hydraulically connected with said circular working face and being temporarily hydraulically connected through said passages with the annular working face and a return line respectively, the outer diameter of the sealing surface of the hollow member adjacent to the passage to the annular working face being smaller than the inner diameter of the outer sealing surface of the hollow member being greater than the diameter of said cylindrical sealing surface, said hollow member having annular reaction surfaces thereon surrounding the first mentioned sealing surface and surrounded by the second mentioned sealing surface, said reaction surfaces being of the same size.

5. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means including two valve bodies connected with the piston, a hollow control member surrounding the piston rod and axially reciprocable between said valve bodies, a sealing ring cooperating with an outer cylindrical sealing surface of said hollow member, a pressure chamber hydraulically connected to said annular working face, said sealing ring being provided in the end wall of the cylinder, said hollow member projecting through a sealing ring into the pressure chamber of said cylinder adjacent to said annular working face, said valve bodies and said hollow member having cooperating annular sealing faces tightly pressed one upon the other when the hollow member is forced against the respective valve body and forming a passage between said sealing face when the hollow member is moved in the opposite direction, the interior of the hollow member being continuously hydraulically connected with said circular working face and being temporarily hydraulically connected through said passages with the annular working face and with a return line respectively.

6. A pressure fluid operated actuator device comprising a pressure cylinder, a double acting actuator piston in said cylinder having a circular working face on one side and an annular working face surrounding the piston rod on the other side, means for feeding pressure fluid to the side of the piston provided with said annular working face, pressure fluid flow control means including two valve bodies, one of said valve bodies being the piston head and the other valve body being mounted on the piston rod, a hollow control member surrounding the piston rod and axially reciprocable between said valve bodies, a sealing ring cooperating with an outer cylindrical sealing surface of said hollow member, a pressure chamber hydraulically connected to said annular working face, said sealing ring being provided in the end wall of the cylinder, said hollow member projecting through said sealing ring into the pressure chamber of said cylinder adjacent to said annular working face, said valve bodies and said hollow member having cooperating annular sealing faces tightly pressed one upon the other when the hollow member is forced against the respective valve body and forming a passage between said sealing surfaces when the hollow member is moved in the opposite direction, the interior of the hollow member being continuously hydraulically connected with said circular working face and being temporarily hydraulically connected through said passages with the annular working face and with a return line respectively.

References Cited in the file of this patent
UNITED STATES PATENTS 2,519,311    Ferguson _____ Aug. 15, 1950

FOREIGN PATENTS 861,247    France _____ Oct. 22, 1940